(12) United States Patent
Klene

(10) Patent No.: US 7,418,924 B2
(45) Date of Patent: Sep. 2, 2008

(54) KIT OF PARTS FOR AND A LIVESTOCK FEEDER

(76) Inventor: Robin R. Klene, 1705 N. Nightingale Dr., Greensburg, IN (US) 47240

( * ) Notice: Subject to any disclaimer, the term of this patent is extended or adjusted under 35 U.S.C. 154(b) by 110 days.

(21) Appl. No.: 11/243,389

(22) Filed: Oct. 4, 2005

(65) Prior Publication Data

US 2006/0070580 A1  Apr. 6, 2006

Related U.S. Application Data

(60) Provisional application No. 60/522,461, filed on Oct. 4, 2004.

(51) Int. Cl.
*A01K 1/10* (2006.01)
(52) U.S. Cl. ............................ 119/60; 119/61.1; 119/900
(58) Field of Classification Search ............. 119/51.01, 119/53, 58, 59, 60, 61.1, 61.2, 61.3, 61.31, 119/900; D30/121; 5/93.1, 97
See application file for complete search history.

(56) References Cited

U.S. PATENT DOCUMENTS

| | | | | | |
|---|---|---|---|---|---|
| 43,023 | A | * | 6/1864 | Hart | 119/58 |
| 45,011 | A | * | 11/1864 | Allerton | 119/58 |
| 83,561 | A | * | 10/1868 | Smith | 119/60 |
| 363,089 | A | * | 5/1887 | Shorter | 119/59 |
| 473,245 | A | * | 4/1892 | Taft et al. | 119/58 |
| 708,297 | A | * | 9/1902 | Baughman | 119/58 |
| 1,017,758 | A | * | 2/1912 | Howell | 119/58 |
| 2,651,057 | A | * | 9/1953 | Power | 5/93.1 |
| 2,853,087 | A | | 9/1958 | Klene | |
| 3,885,524 | A | | 5/1975 | Gregory | |
| 3,906,902 | A | * | 9/1975 | Rose | 119/60 |
| 4,020,794 | A | * | 5/1977 | Nethery | 119/58 |
| 4,722,302 | A | * | 2/1988 | Gee, Jr. | 119/60 |
| 4,976,222 | A | | 12/1990 | Cooke | |
| 5,040,254 | A | * | 8/1991 | Frank | 5/99.1 |
| 5,178,096 | A | * | 1/1993 | Lock | 119/58 |

(Continued)

FOREIGN PATENT DOCUMENTS

DE  37 07 537 A1  9/1988

(Continued)

*Primary Examiner*—Peter M. Poon
*Assistant Examiner*—Kristen C Hayes

(57) ABSTRACT

A livestock feeder (50) includes a gravity pulled, fold-down grill (56,57) on both sides of a main frame (51) that can hold a supply of livestock feed such as a hay bale (82) therein. The fold-down grills face each other and fold down on a hay bale positioned on the floor (60) of the feeder as the hay bale is consumed by livestock such as a horse. Grill spacer bars (65,101) are positioned apart from each other to allow only the muzzle of the feeding animal to reach there through and grasp the hay. The feeder also includes a pair of pivot arms (96-99) at the base of each grill to pivot the grill toward the floor of the feeder. Each pivot arm extends from a rotatable member (69-72) connected to the frame. The rotatable members and grill are lifted to hang the grill on a pair of latches (75-78) that lock the grill in a locked upright position for loading of another bale on the feeder floor through an end gate (58,59) that is rotatably connected to the main frame. The end gate can include spacer bars (105,109) to allow livestock to reach and feed there through.

20 Claims, 9 Drawing Sheets

U.S. PATENT DOCUMENTS

| | | | |
|---|---|---|---|
| 5,331,922 A * | 7/1994 | Olynyk | 119/60 |
| 5,509,377 A | 4/1996 | Franklin | |
| 6,006,696 A | 12/1999 | Mann | |
| 6,601,536 B2 * | 8/2003 | Sprik | 119/60 |
| 6,606,962 B2 | 8/2003 | Elliott | |

FOREIGN PATENT DOCUMENTS

| | | |
|---|---|---|
| DE | 40 41 882 A1 | 7/1992 |
| EP | 0 361 099 B1 | 4/1990 |
| EP | 0 970 604 B1 | 1/2000 |
| GB | 0 849 689 A | 2/1960 |
| GB | 0 936 002 A | 9/1963 |
| GB | 1 491 236 A | 11/1977 |
| GB | 2 374 513 A | 10/2002 |

* cited by examiner

KIT OF PARTS FOR AND A LIVESTOCK FEEDER

CROSS-REFERENCE TO RELATED APPLICATIONS

This application claims priority of provisional application Ser. No. 60/522,461, filed Oct. 4, 2004.

TECHNICAL FIELD

This invention is directed to a livestock feeder and, in particular, to a livestock feeder having a feeding grill and a kit of parts for the livestock feeder.

BACKGROUND OF THE INVENTION

Containers are often used to facilitate feeding hay and other feed to animals. These containers provide a repository for a quantity of hay from which the animals can self-feed. Various feeder configurations have been sold commercially. A typical feeder includes a cylindrical sheet metal base open at the bottom and top. This kind of feeder helps to separate the hay from animal waste and prevent the animals from walking in the hay. It also prevents the hay from blowing away and being wasted after the level of the hay reaches the sheet metal base. Some prior art feeders include bars extending above as well as below the base. The upper bars are spaced to accommodate the head and neck of the animal, but still permits the hay to be retained in the feeder. The lower bars permit rain to drain from the feeder as well as to make it easier to lift and move the feeder to another location.

A problem with prior art feeders is that they allow the animals to root through or bury their heads in the hay in search of the most palatable hay. As the animals root through the hay, they pull out large quantities of which they then drop a large amount of it on the ground, resulting in waste and contamination. Later, if the animals get around to eating the hay left on the ground, they often ingest contaminants such as sand and animal waste. An animal that buries its head in the hay also subjects the animal to breathing in hay and other dust particles, which can very often, especially for horses, lead to respiratory problems.

Other types of prior art large bale feeders have generally included some type of bale holding cradle which is accessible by livestock from one or more sides of the feeder. In most such feeders, the bale holding cradle is fixed in size which means that, as the hay bale shrinks during feeding, access to the bale by feeding livestock may be interrupted. This can result in wasted hay and also in damage to the feeder as well as the animal as the animal such as horses and cattle push against the feeder in an effort to reach the shrinking hay.

SUMMARY OF THE INVENTION

The foregoing problems are solved and a technical advance is achieved in an illustrative embodiment of the present invention in a livestock feeder that has a grill with uniformly spaced bars that pivots down toward a supply of feed positioned on the floor of the feeder. The uniformly spaced grill bars advantageously prevent the animal from burying its head in the feed, but allows the muzzle of the animal to reach through the bars and bite a mouthful of hay. This also advantageously minimizes feed waste and prevents the animal from breathing in dust and hay particles, which can produce serious respiratory problems. Furthermore, as the animal consumes the supply of feed through the grill spacer bars, the grill also advantageously pivots or folds down on the feed allowing continuous access to the feed until the entire supply is consumed. The grill bars have a space there between that is dependent on the kind of livestock that is intended to reach the feed through the grill spacer bars.

In an illustrative embodiment of the present invention, the livestock feeder includes a main frame having a plurality of corner members and floor supports that can maintain the corner members in an upright position to hold a supply of livestock feed. The floor supports, typically with a floor there on, advantageously holds the supply of livestock feed such as hay above the ground so that the animal can not paw at the feed and waste it. The fold—down grill has a plurality of spacer bars having preferably a uniform space there between. This grill bar space is dependent on what kind of livestock is intended to reach a supply of livestock feed through the grill spacer bars. This advantageously allows only the muzzle of the intended animal to reach through the spacer bars and bite a mouthful of feed, thus minimizing feed waste and preventing the animal from breathing dust and hay particles. The feeder also includes at least one and preferably a pair of pivot arms pivotally connecting a pair of the corner members and the grill above the floor supports. This allows the grill to pivot and fold-down toward the floor supports as for example a supply of livestock feed is consumed.

In another aspect, the present invention includes a kit of parts for the livestock feeder. The kit of parts far the livestock feeder includes a plurality of corner members and floor supports that can be assembled to support a supply of livestock feed. The kit also includes a grill having a plurality of grill spacer bars and at least one base member that can be assembled with the grill spacer bars to maintain a grill bar space between the spacer bars. The grill bar space is dependent on what kind of livestock can reach a supply of livestock feed through the spacer bars. Also included is at least one and preferably a pair of pivot arms that can be assembled with the grill to pivot the grill preferably downward toward the floor supports.

The kit of parts further includes a rotatory member including the at least one pivot arm that can be assembled with the grill and rotated to position the grill into a fixed, preferably upright, position with respect to the floor supports.

To advantageously provide additional access to the supply of feed, the kit of parts includes an other grill having parts similar to the at least one grill. At least one other pivot arm is included in the kit that can be assembled with the other grill to pivot the other grill toward the floor supports and the at least one grill. Thus, the kit includes at least two opposing grills to fold-down on the supply of livestock feed and toward the floor supports as the feed is consumed by the livestock reaching through the spacer bars of the two opposing grills.

To supplement this additional grill, at least one and preferably a pair of other rotatory members including the other pivot arms are provided in the kit that can be assembled with the other grill and rotated to position the other grill into a fixed, preferably upright, position. This permits a supply of feed to be easily loaded into the feeder. This also allows an operator to enter the feeder and clean out any feed from the last supply without the animals pushing the grills onto the operator. In addition, this fixed upright position can also be used to essentially stop or limit any further feeding by the animals.

The kit of parts for the livestock feeder also includes at least one and preferably a pair of end gates that can each be assembled with at least one of the corner members and the floor supports and opened to position a supply of livestock feed on the floor supports. Each end can further include a plurality of spacer bars and at least one gate base member that can be assembled with the gate spacer bars to maintain a gate bar space between the gate spacer bars. The gate bar space is dependent on what kind of livestock can reach a supply of livestock feed through the gate spacer bars. The gate bar space and the grill bar space can all be the same or each can be different again depending on what kind of livestock is intended to reach through the gate or grill. The gate and grill bar space each ranges from 2 inches to 8 inches. Preferably, the bar space can be 4 inches for horses, 6 inches for cattle, 7 inches for buffalo, and 3 inches for exotic animals such as alpaca, llama, etc.

The kit of parts still further includes at least one and preferably a pair of grill latches that can each be assembled with either the grill or one of the corner members to latch the grill in the fixed, preferably upright, position.

The kit of parts yet further includes a gate latch for each of the gates and can be assembled with either the gate or one of the corner members to latch the end gate.

The kit of parts yet still further includes a plurality of roof parts that can be assembled with the corner members to attach a roof to the livestock feeder.

The kit of parts also includes at least one and preferably a plurality of floor members that can be assembled with the floor supports to hold a supply of livestock feed.

In still another aspect of the invention, all or any combination of the above kit parts can be assembled to provide a livestock feeder with all or any combination of the features and advantages provided by those parts.

DETAILED DESCRIPTION

Figure 1:
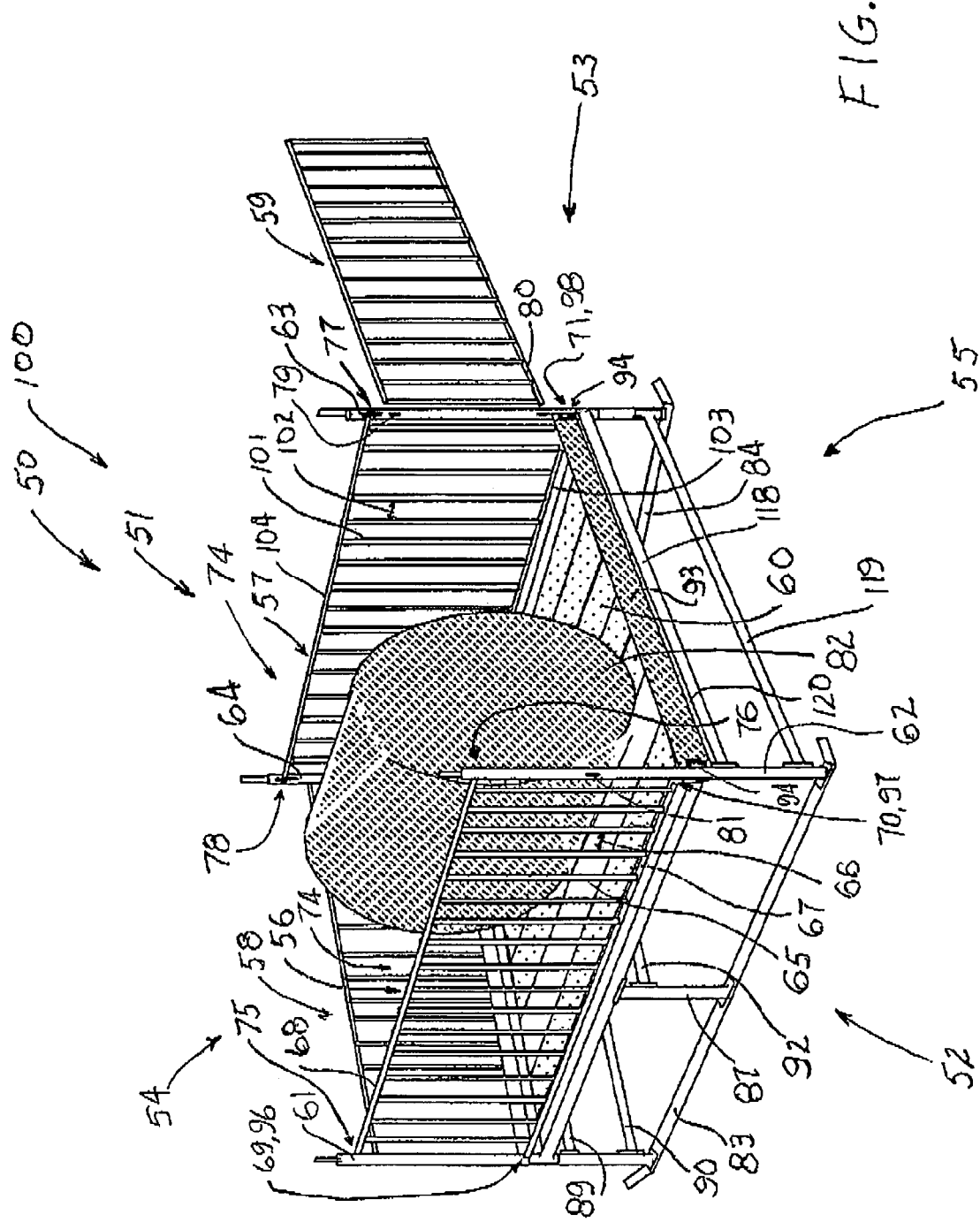
FIG. 1 depicts a pictorial view of a preferred illustrative livestock feeder of the present invention.

FIG. 1 depicts a pictorial view of a preferred illustrative livestock feeder 50 of the present invention. The feeder is assembled from a kit of parts 100, which is commercially available from Klene Pipe Structures, Greensburg, IN . The livestock feeder is intended to feed livestock such as cattle or horses a supply of feed 82 such as a large 1,500 pound bale of hay. However, any size bale of hay will work equally well. The bales can be round or square. The supply of feed can also include loose hay or silage or any other type of feed in which livestock can feed through the fold-down and gravity-pulled side grills 56 and 57. Opposing, fold-down grills 56 and 57 can pivot toward floor 60 and lean against the hay or other feed on the floor so that livestock must pull the hay through grill bar spaces 66 and 102 between grill spacer bars 65 and 101, respectively. The fold-down grills allow an animal to bite only small portions of feed or hay at a time through the spacer bars thus, eliminating waste. The grill bar spaces also prevent the animal from burying its face deep into the feed or hay bale that can cause lung problems from inhaling the hay dust. Grill base members 67,68;103,104 are assembled and positioned at each end of grill spacer bars 65 and 102, respectively, to maintain the grill bar space between the grill spacer bars. At least one pivot arm 96-99 is assembled with each grill to pivot the grill preferably down toward the floor. Preferably, a pair of pivot arms 96,97;98,99 is assembled with respective side grills 56 and 57 by positioning one each in the ends of the lower side grill base members 67 and 103, respectively.

The side grills can also be advantageously positioned into a fixed or locked upright position 74. The fixed upright position of the side grills keeps the head of the animal out of the feeder while an operator is standing in the feeder or a new bale is being loaded into the feeder. In the preferred embodiment of the invention, at least one rotatory member 69,70;71,72 including a respective pivot arm 96,97;98,99 is assembled with each side grill 56;57 and rotated to position the respective side grill into the fixed, preferably upright, position. This is easily accomplished by simply grasping each of side grills 56;57 and lifting it up, over and onto a pair of grill latches 75,76;77,78. Each grill latch is assembled with at least one of the side grills and corner members 61-64. Preferably, grill latches 75-78 are positioned on the upper end of respective corner members 61-64 of main frame 51. As each side grill is lifted, a pair of rotatory members associated with the grill is rotated up along with the pivot arms to position the grill over and onto a pair of associated grill latches on the associated corner members.

With a basic understanding of the operation of the livestock feeder of the present invention, a more detailed description of the feeder and the kit of parts for the feeder of FIG. 1 will be provided. Main frame 51 of, for example, rectangular or square feeder 50 includes first and second side sections 52 and 53 assembled with and connected to first and second end sections 54 and 55. By way of example, each of the side and end sections is approximately 82 inches long.

Figure 2:
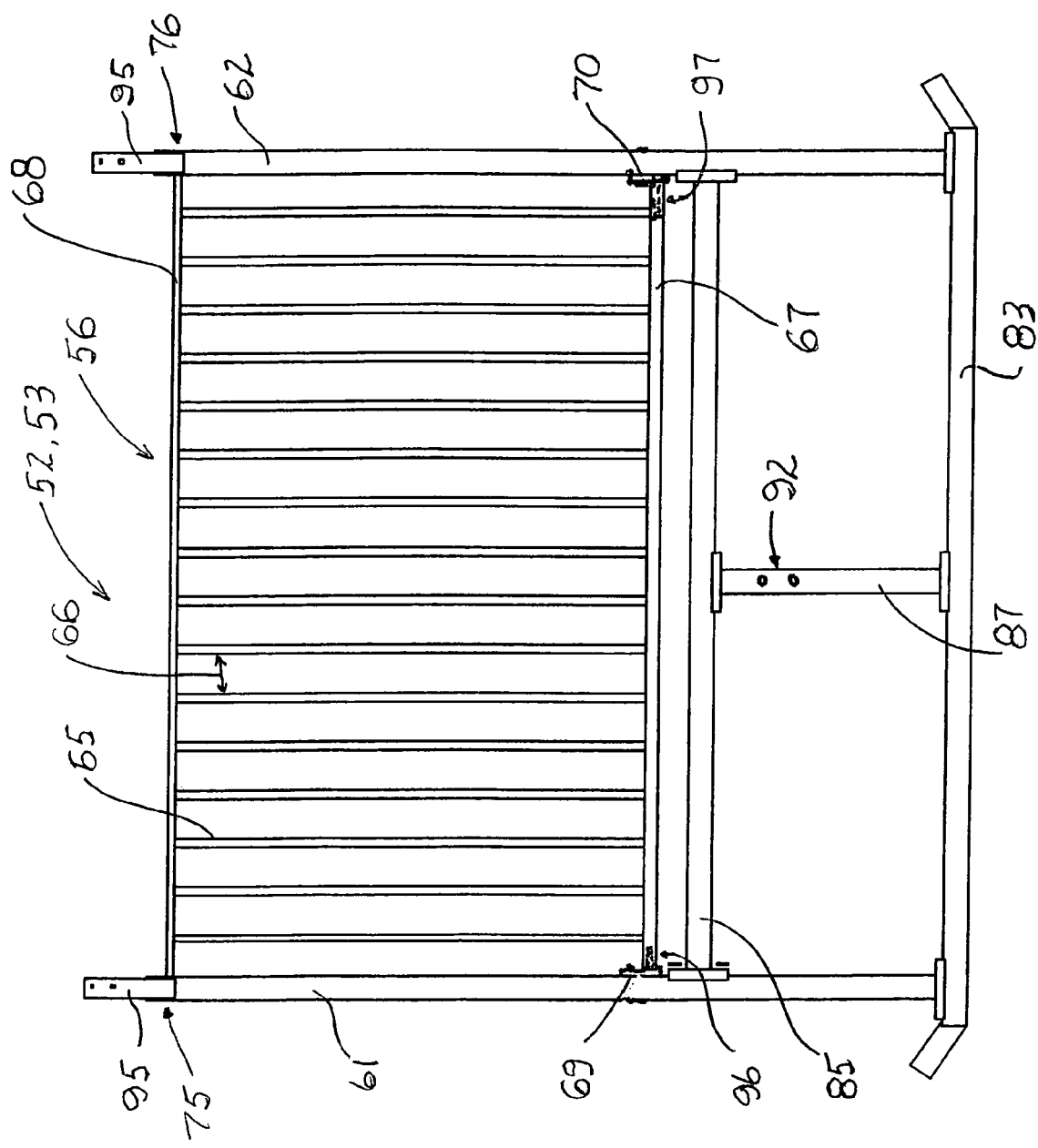
FIG. 2 depicts a side view of the first and second side sections of the feeder of FIG. 1 and the parts associated therewith.

FIG. 2 depicts an outside view of first and second side sections 52 and 53 of the feeder of FIG. 1 and the parts associated therewith. For the most part, the two side sections are identical, and therefore, only the first side section 52 need be provided for an understanding of the parts, assembly and operation of the livestock feeder. First side section 52 includes frame corner members 61 and 62 that are assembled with and connected to the opposite ends of first bottom runner 83. The corner members, which for example are approximately 81 inches tall, are connected in a perpendicular manner to the runner so that the corner members can assume a preferable upright or vertical position. The other or top end of each upright corner member has a roof strap 95 such as a short piece of angle iron welded thereto and facing outward. A roof structure is attached to these roof straps to shield the livestock feed from rain. The runner is intended to lay flat on the ground with the ends turned up so that the feeder can be more easily pulled or dragged from one location to another. Upright corner members 61 and 62 are assembled preferably in a perpendicular position with and supported by first side support beam 85 that is positioned above runner 83 in preferably a parallel position. A first side brace beam 87 is assembled with and positioned in a perpendicular orientation to runner 83 and first side support beam 85 approximately midway between frame corner members 61 and 62. The side brace beam is also assembled with and connected to floor support mid-beam 92 (FIG. 1) to help support the weight of the livestock feed, which can include an 1800 pound or more hay bale. Preferably, all of these parts are constructed from 2.5 inch outside diameter 10 gauge galvanized pipe with the interconnection and assembly provided by a U-shaped channel saddle at the ends of the pipe and around the round interconnecting pipe. The saddle and interconnecting pipe are secured together using preferably two 3.5 inch hex head machine bolts. This channel iron connection provides extreme durability, was patented by the Klene Pipe Structures company and is described in more detail in U.S. Pat. No. 2,853,087, which is incorporated by reference herein.

Fold-down side grill 56 includes a plurality of grill spacer bars 65 having a uniform grill bar space 66 there between. The side grill also includes first and second or lower and upper base members 67 and 68 that are assembled with and connected to the grill spacer bars to maintain the uniform space between the spacer bars. The grill spacer bars are preferably vertically oriented with the two base members horizontally assembled to the ends of the spacer bars. The spacer bars and base members can be individually provided in the kit of parts for the feeder; however, for the convenience of the end user, the side grills are preferably assembled at the factory using, for example, Mig welding to interconnect the parts more uniformly. The orientation of the spacer bars and base members can also be reversed so that the spacer bars are horizontal and the base members vertical. It is also contemplated that the spacer bars can be oriented at any angle between a vertical and horizontal position as long as the uniform bar space is maintained. It is further contemplated that the grill can be a grid of apertures so as to allow only the muzzle of the feeding animal to reach through and grasp a mouthful of the supply of feed. By way of example, grill spacer bars 65 are constructed from ¾ inch outside diameter, 18 gauge metal tubing; whereas upper grill base member 68 is constructed from ¾ inch outside diameter, 18 gauge metal tubing. Lower grill base member 67 is preferably 1.25 inch outside diameter 10 gauge metal tubing. Grill bar space 66 normally ranges from 2 inches to 8 inches depending on the kind of livestock that can reach the supply of feed through grill spacer bars 65. For normal size horses, the preferred grill bar space is 4 inches. For cattle, the preferred bar space is 6 inches. For buffalo, the preferred space is 7 inches, and for exotic animals such as alpaca and llama, the preferred space is 3 inches. Regardless, the grill bar space is selected to allow only the muzzle of the feeding animal to reach there through to get a mouthful of feed. The bar space is intended to prevent the head of the animal from extending through the spacer bars and being buried in the supply of feed.

Figure 3:
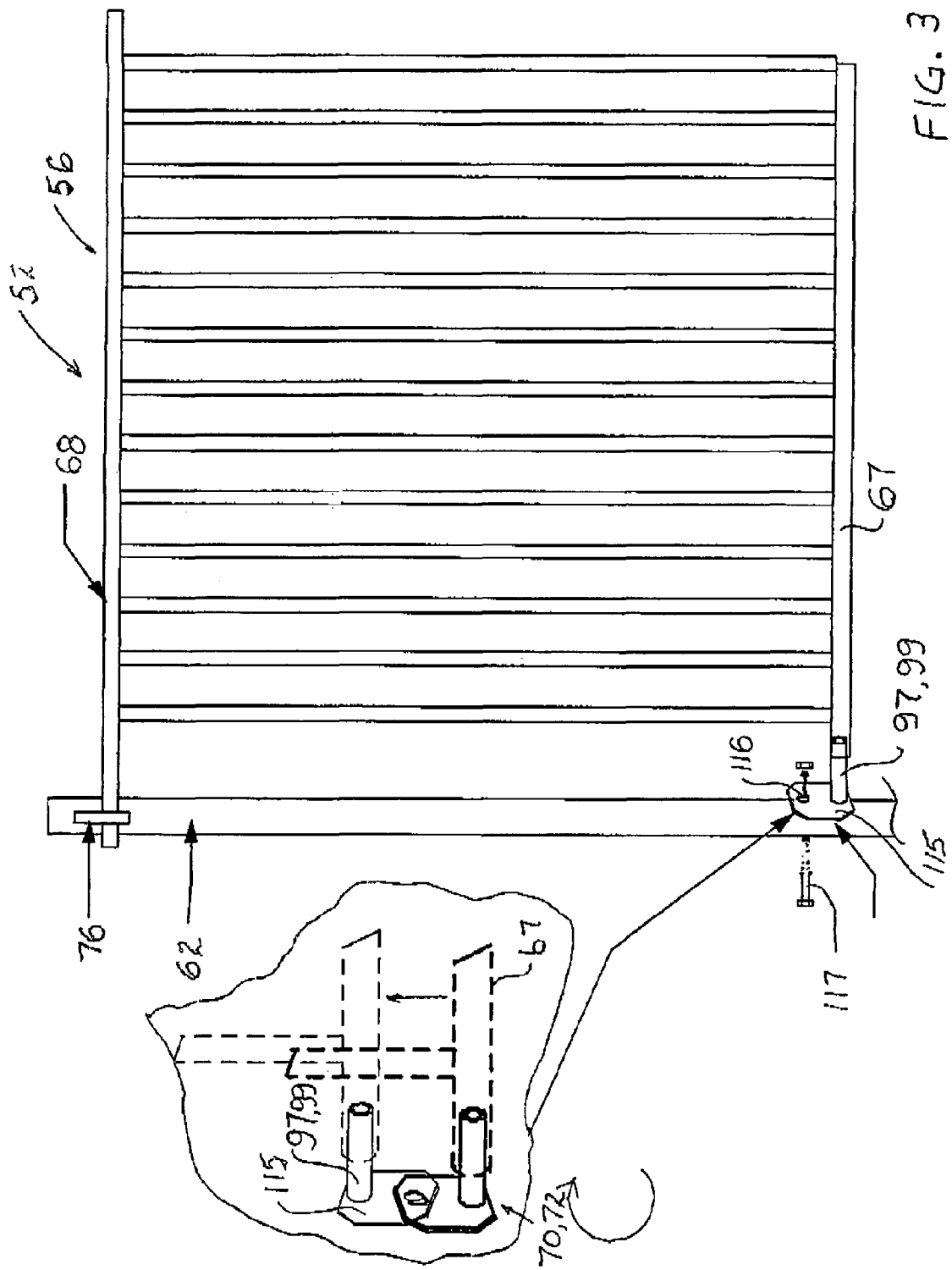
FIG. 3 depicts an enlarged, partial inside view of the first side section of FIG. 2 detailing the side grill in the fixed or preferably locked upright position.

First side section 52 also includes fold-down side grill 56 that is assembled with and positioned with upper base member 68 on the inside of the first side section or main frame and the rest of the grill between corner members 61 and 62. At least one and preferably two pivot arms 96 and 97 are assembled with the side grill to pivot the side grill down toward floor 60. Preferably, the pivot arms are inserted into the ends of the hollow tube, lower base member 67 to pivot the side grill downwards toward the floor. As a consequence, a supply of feed is positioned between the fold-down side grill and the floor and compressed by the side grill as the feed is consumed by the animal. Preferably, the side grill weighs approximately 30 pounds, which is enough to maintain its fold-down position against the feed and to compress, but not compact the feed as it is consumed. At least one and preferably two rotatory members 69 and 70 including respective pivot arms 96 and 97 perpendicularly positioned thereon are assembled with the grill and corner members 61 and 62, respectively, and rotated to position the side grill into a fixed or upright position with respect to the floor. This is accomplished by first and second grill latches 75 and 76 being assembled with respective corner members 61 and 62 and positioned near the top end on the inside of the corner members. When the side grill is grasped and directed upward, rotatory members 69 and 70 rotate upwards with respective pivot arms 96 and 97 to allow upper base member 68 of the grill to go up and over the ends of and onto the L-shaped grill latches. Thus, the side grill is latched to the corner members and in a fixed, preferably upright position with respect to the floor of the feeder FIG. 3 depicts an enlarged, partial inside view of first side section 52 of FIG. 2 detailing the side grill in the fixed or locked upright position. Upper base member 68 of side grill 56 has been lifted over and is engaging the inside of L-shaped grill latch 76. The grill latch is assembled with main frame corner member 62 near the top end thereof with the threaded end of the lower leg of the L-shaped latch extending through the corner member and secured to the corner member with for example a hex head nut or an other suitable fastener. The vertical portion of the grill latch prevents the side grill from folding down toward the floor of the feeder and helps maintain the side grill in a fixed upright position between the latch and corner member. Rotatory member 70 includes a flat plate 115 with pivot arm 97 fixedly assembled and extending perpendicularly therefrom at one end of the flat plate. Pivot arm 97 is inserted into the end of hollow tube, lower base member 67, which pivots about the pivot arm. The other end of the flat plate includes a hole 116 through which a bolt 117 extends through the flat plate and corner member to assemble the rotatory member with the corner member and side grill. The exploded view of rotatory member 70 illustrates the rotation of the member in either a clockwise or counterclockwise direction. The dotted line representation of the lower base member 67 illustrates that the side grill can be vertically lifted to position the upper base member of the grill up and over the grill latch. In this preferred embodiment, the flat plate hole and pivot arm are positioned approximately 2.75 inches apart, which in turn translates to the same vertical travel of the side grill up, over and onto the L-shaped grill latch.

As previously indicated first side section 52 and second side section 53 in FIG. 1 are nearly identical. As depicted, second fold-down grill 57 opposes first fold-down grill 56, each of them being able to pivot down toward floor 60 and make contact with one side or the other of hay bale 82. Second side grill 57 includes a plurality of other grill spacer bars 101 with other lower and upper base members 103 and 104 assembled and positioned with the other grill spacer bars to maintain an other grill bar space 102. This bar space, like that of grill bar space 65, can range from 2 inches to 8 inches and is dependent on what kind of livestock can reach a supply of feed through the other grill spacer bars. For the most part, the same animals would be expected to feed from either side of the feeder. However, this feeder can be positioned to straddle two feeding lots or paddocks. As a consequence, there may be two different kinds of animals feeding from the same feeder. Thus, the grill bar space could be made different to accommodate the two different kinds of animals. In addition, the orientation of the spacer bars from one side to the other could also be made different. One set could have a vertical orientation, while the other set could be horizontal or even have some orientation somewhere there between.

Second fold-down grill 57 is assembled with and positioned as previously described with upper grill base member 104 on the inside of the main frame corner members and in particular corner members 63 and 64. Corner members 63 and 64 are assembled with and are vertically positioned with respect to second runner 84. Parallel to and above the second runner, second side beam 86 (not shown) is assembled with and perpendicular to corners members 63 and 64. Also not shown is second side brace beam 88, which is assembled with and positioned between the second runner and the second support beam approximately midway between parallel corner members 63 and 64. One is referred to FIG. 2 for the assembly and positioning of the corner members and supports as shown with respect to first side section 52. Grill latches 77 and 78 are assembled with and positioned at the top end of respective corner members 63 and 64. Also in FIG. 1 are rotatory members 71 and 72 (not shown) with respective pivot arms 98 and 99 (not shown) extending into the opposite ends of hollow tube, lower base member 103. These rotatory members are assembled with the second side grill and rotated to position the second grill into a fixed position with respect to floor 60 by lifting the grill and positioning second side, upper base member 104 into the grill latches that are positioned at the top end of corner members 63 and 64.

Figure 4:
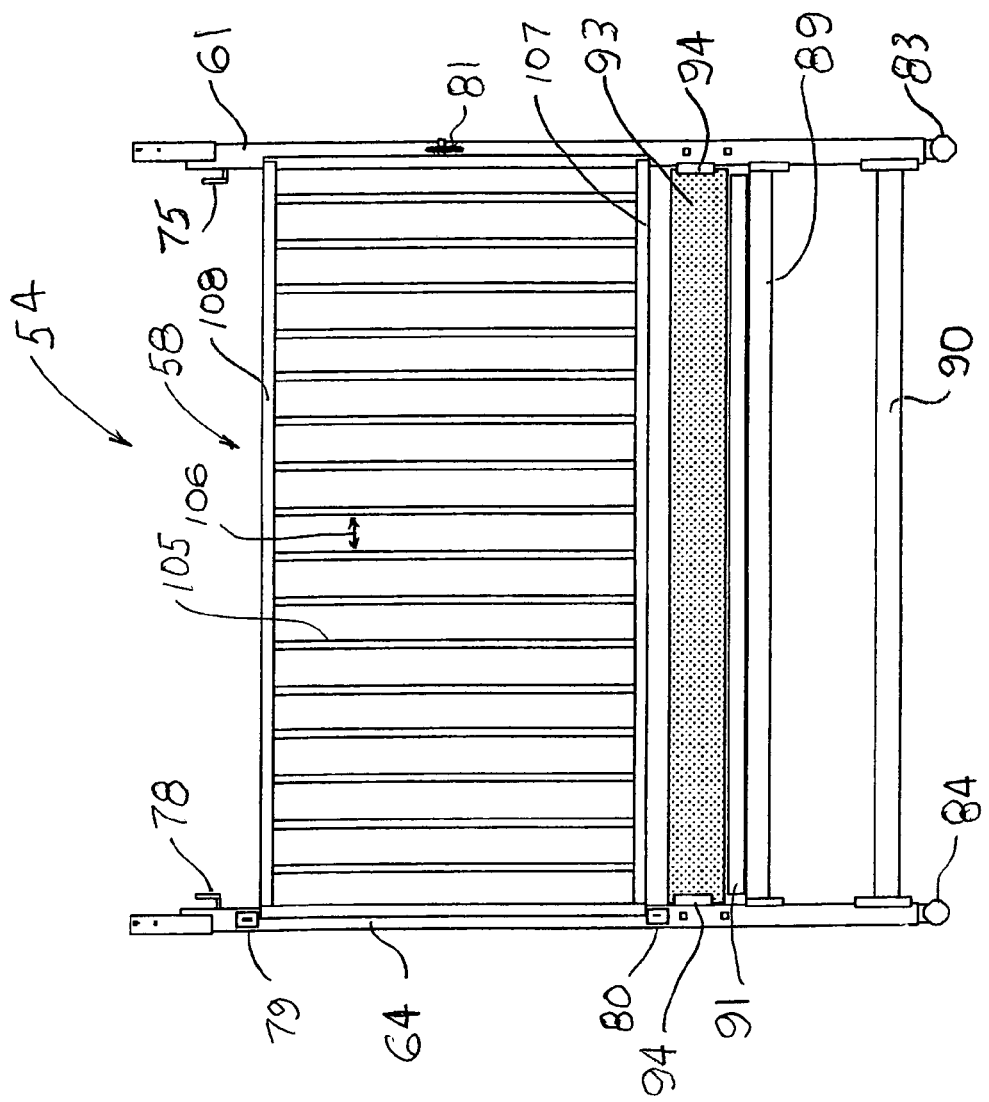
FIG. 4 depicts an end view of the first end section of the livestock feeder of FIG. 1.

FIG. 4 depicts an end view of first end section 54 of the livestock feeder of FIG. 1. For all practical purposes, this end view would also equally apply to second end section 55 of the feeder with the possibility that the end gate spacer bars could have a different orientation as discussed with the grill spacer bars. The gate bar space could also differ from one end to the other. Furthermore the end gate spacer bars could be replaced with well-know and commercially available livestock fencing wire that typically exhibits a 4×4 inch square grid configuration. However for most applications, the two end sections will be identical in appearance and operation. The two end sections are assembled with and interconnect the two side sections of main frame 51. The end and side sections share common corner members.

First end section 54 includes and shares common corner members 61 and 64 that are assembled with respective runners 83 and 84 and extend perpendicularly therefrom in an upright or vertical position. A plurality of floor supports 89 and 118 can be assembled with corner members 61-64 to support floor 60 and, in turn, a supply of feed such as hay bale 82 positioned on the main frame floor. In particular, first end floor support 89 is assembled with and interconnects corner members 61 and 64 so as to set the height of floor 60 at, for example, approximately 32 inches. This height helps keep the livestock such as horses from trying to paw the bale or supply of feed thereon. However, the vertical height of the floor support beam can be varied up or down again dependent on the kind of livestock that is utilizing the feeder. First end lower support 90 is assembled with and interconnects corner members 61 and 64 just above runners 83 and 84 to help keep the corner members in an upright or vertical position. These two supports are constructed from 2.5 inch outside diameter galvanized pipe with U-shaped channels at the ends thereof and are connected to corner members with 3.5 inch hex head bolts as previously described with respect to the side supports and runners. However, first end floor support 89 utilizes only one bolt at each end to make room for wood planks that are typically utilized for the floor. The floor planks are kept in place by first end floor retention angle 91 that is preferably a 2 inch piece of angle iron welded to the top of the steel pipe of floor support 89 and facing in towards the floor.

Just above first end floor support 89, a U-shaped retainer channel 94 is assembled with and attached to each of corner members 61 and 64. This is preferably a 2 inch by 1 inch by 4 inch iron channel that can receive and hold in place retainer board 93 such as a 2 inch by 6 inch wood plank. The iron channel is preferably welded to the corner members. This retainer can be removed to clean the feeder more easily and then replaced to help retain the next supply of livestock feed.

First end section 54 also includes first fold-out end gate 58 that is assembled with and attached to corner member 64 with upper and lower gate hinges 79 and 80 just above retainer board 93. These hinges are assembled with and attached to corner member 64 using, for example, a single 3.5 inch hex head machine bolt for each hinge. The hinge has a short round shaft that extends up or down into the hollow tube end member of end gate 58. The other end of the gate includes a pin extending perpendicularly therefrom and can be lifted up and over into L-shaped gate latch 81 that is preferably assembled with and attached to corner member 61 by extending there through and being secured with a hex head nut on the threaded end thereof.

Figure 5:
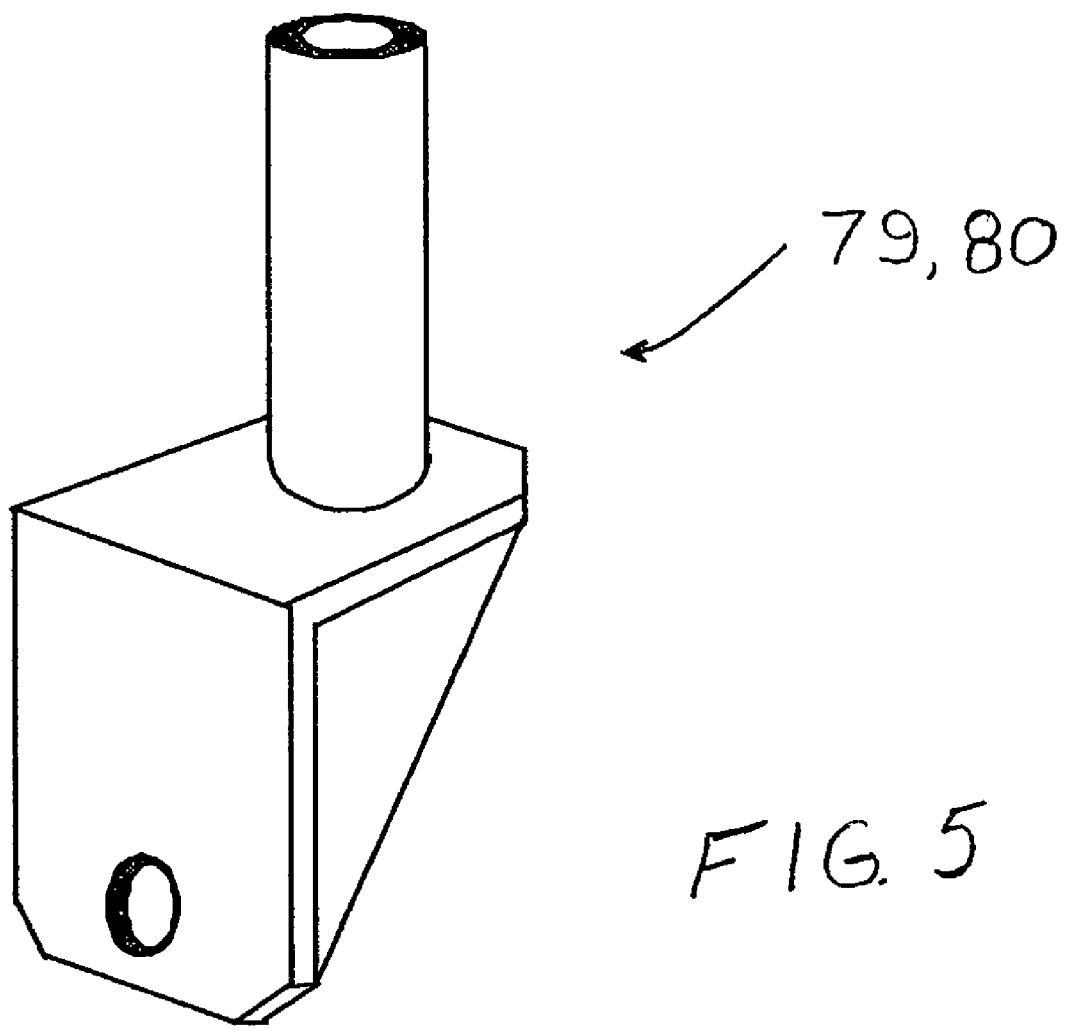
FIGS. 5, 6 and 7 depict side and pictorial views of the gate hinges, the gate latch and the grill latches, respectively, that can be assembled with and attached to the corner members of the livestock feeder of FIGS. 1-4.
Figure 6:
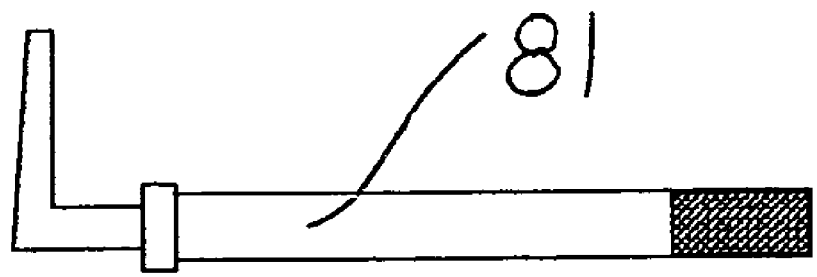
Figure 7:
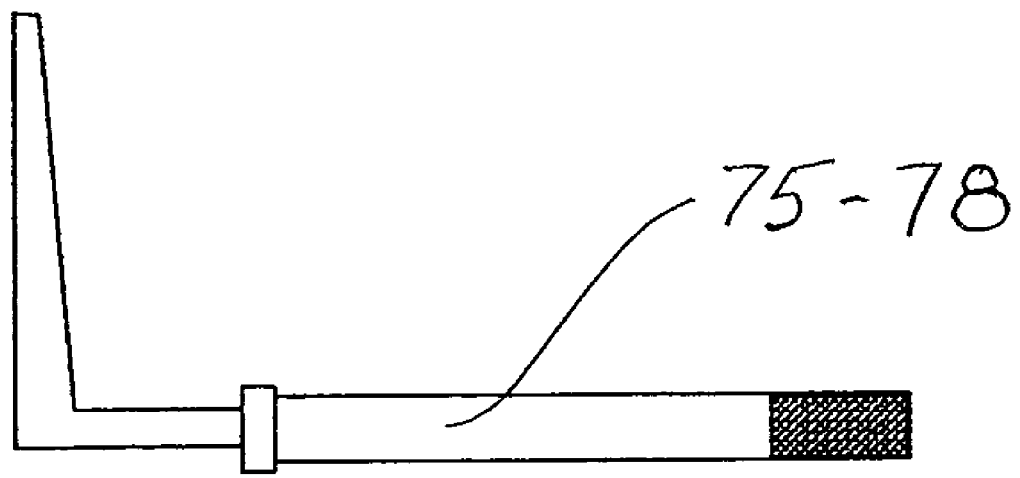

FIGS. 5, 6 and 7 depict side and pictorial views of gate hinges 79 and 80, gate latch 81 and grill latches 75-78, respectively, that are assembled with and attached to the corner members of the livestock feeder of FIGS. 1-4. These are exemplary fasteners that are utilized with this livestock feeder, and it is contemplated that other well-known and commercially available fasteners could be substituted and utilized by one ordinarily skilled in the art.

Returning to FIG. 4, first end gate 58 includes a plurality of gate spacer bars 105 and lower and upper base members 107 and 108. The gate base members are assembled with and connected to the gate spacer bars to maintain a uniform gate bar space 106 between the gate spacer bars. The gate bar space is dependent again on the kind of livestock that can reach feed through the gate spacer bars and ranges from 2 inches to 8 inches as previously described. As depicted, the gate base members are oriented perpendicular to the gate spacer bars; however, and any orientation between a horizontal and vertical position is contemplated. This orientation was also explained and incorporated with respect to the grill spacer bars. The gate base members and spacer bars can be supplied separately and assembled together in the desired orientation as long as the gate bar space is maintained. However, these gate parts can be welded together using well-known jigs and forms to provide a gate that is square and plumb and easily attached to a corner member. For example, the gate spacer bars are preferably constructed of 1 inch outside diameter, 14 gauge metal tube, and the gate base and perimeter members are 1.25 inch outside diameter, 10 gauge metal tube. It is contemplated that livestock will want to feed at and through the end sections of the feeder and, in particular, the end gates. However, feeding through the end gates of this feeder is strictly optional and not at all a requirement of the feeder. An end gate is provided essentially to allow easy loading of a supply of livestock feed such as a hay bale on to the floor of the feeder. If loose hay or silage is to be fed, then no end gate is necessary since it could be loaded onto the floor from above the feeder with the side grills latched in the fixed upright or vertical position. In that case, a commercially available 4 inch by 4 inch wire mesh or grid as well as any other cover material can be assembled with and attached to the corner members. It is the fold-down side grills of this feeder that control the feeding of the livestock by folding down on the feed as the feed is consumed. However, the end gates provide further control and elimination of wasted feed.

Also depicted in FIG. 4 are L-shaped grill latches 75 and 78 assembled with and attached to the top end of respective corner members 61 and 64. Likewise, L-shaped grill latches 76 and 77 are attached to the top ends of respective corner members 62 and 63. These grill latches are again utilized to maintain the side grills in a fixed, upright or vertical position with respect to floor 60 of the feeder.

Again returning to FIG. 1, second end section 55 with second fold-out end gate 59 in an opened or folded-out position. The end gate is assembled with and connected to corner member 63 with upper and lower hinges 79 and 80. Gate latch 81 is assembled with and connected to corner post 62 to latch the end gate in a closed position with a pin extending from the end of the gate. Here, the end gate opens from the same side of the feeder, but could also be connected to and open from the other side of the feeder. Second end section 55 also includes second end floor support 118 and second end lower support 119 connected to corner members 62 and 63 in a similar manner as described with respect to the first end section. A second end floor retention 120 is also attached to the top of second end floor support 118 to retain for example floor planks as previously described. Retainer channel 94 is connected to corner members 62 and 64 to hold retainer board 93 in place. This second end gate allows for maximum ease and accessibility to the floor of the feeder to load a supply of livestock feed thereon. However, this fold-out end gate can be easily eliminated, and a retainer wall or wire grid substituted in its place.

Figure 8:
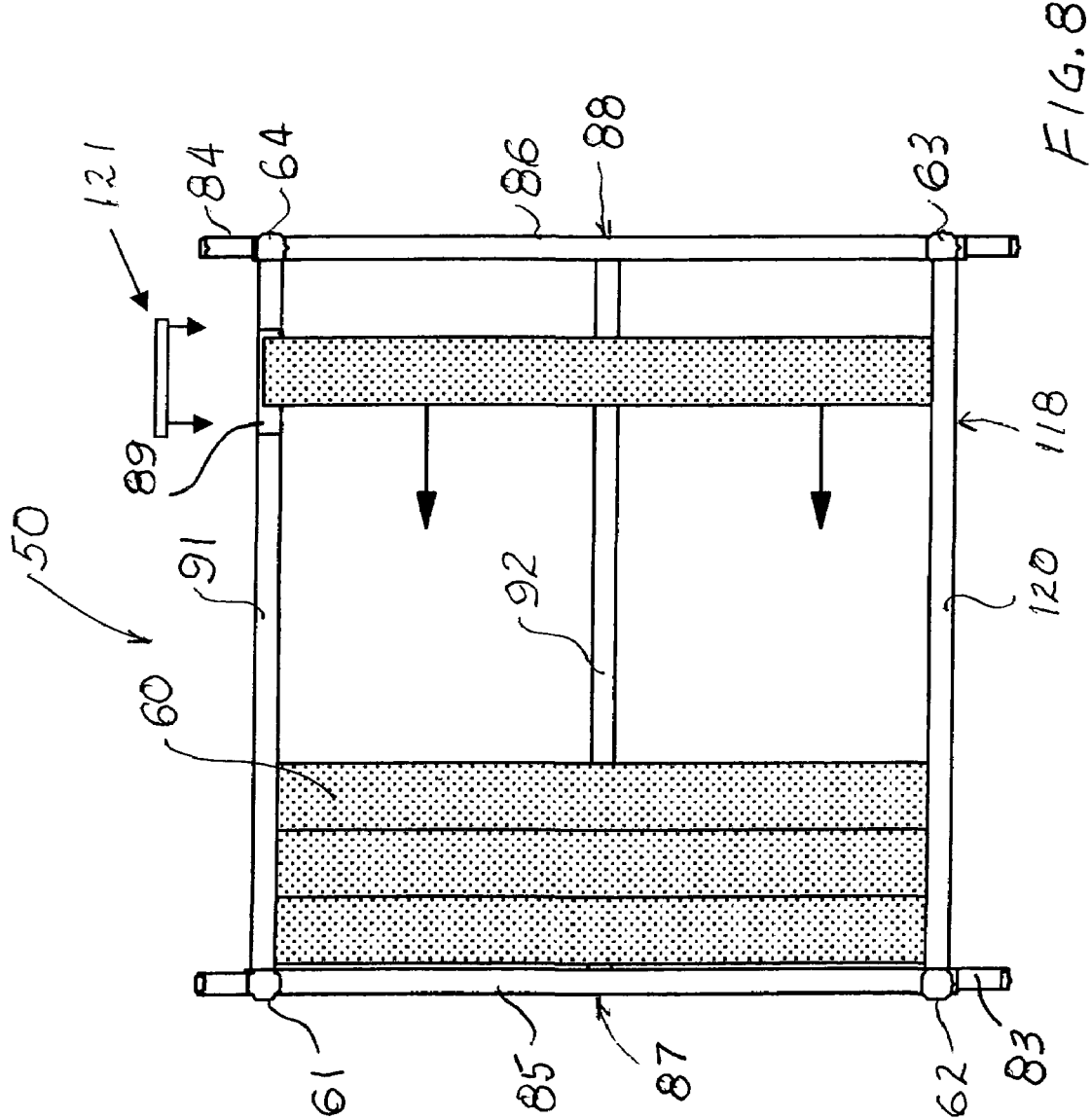
FIG. 8 depicts a top view of the livestock feeder of FIG. 1 with the side grills and end gates removed.

FIG. 8 depicts a top view of the livestock feeder of FIG. 1 with the side grills and end gates removed. All of the assembled parts except mid-floor support 92, the individual planks of floor 60 and floor plank retention strip 121 have been previously described. The ends of mid-floor support 92 are assembled with and connected to, as previously described, to vertically oriented first and second side braces 87 and 88 with the height of the mid-floor support adjusted so as to be at the same height as that of first and second end supports 89 and 118. A notch in retention angle 91 allows the wood planks of floor 60 to be slid in under the two retention angles and on top of floor supports 89 and 118. The sides of the two floor end planks make contact with and are retained by the corner members and the side braces. The ends of the floor planks make contact with and are retained by retention angles 91 and 118. Floor plank retention strip 121 is, for example, a 1 inch by 12 inch strip of metal that is inserted on top of the last plank to be laid and under the notch edges in retention angle 91. The strip is retained in position by fastening it to the top of the last floor plank with screws or any other suitable fasteners. By way of further example, the floor includes 11-2 inch by 8 inch wood boards or planks, the length of which are cut to the width of the floor.

A simple roof may be attached to the top of the livestock feeder to protect the supply of livestock feed from rain and snow. This can be accomplished by bolting 4 inch by 4 inch upright wood posts to the top of the corner members with the aid of roof straps 95. The length of the wood posts are shorter at one end of the feeder than at the other end. This gives the roof a pitch to shed rain and snow. A rafter board is attached to the different length upright wood posts on each side of the feeder. A plurality of roof runner boards are equally spaced on the two rafter boards. Sheet metal can then be attached to the roof runner boards in a well-known manner using, for example, self-tapping sheet metal screws.

Figure 9:
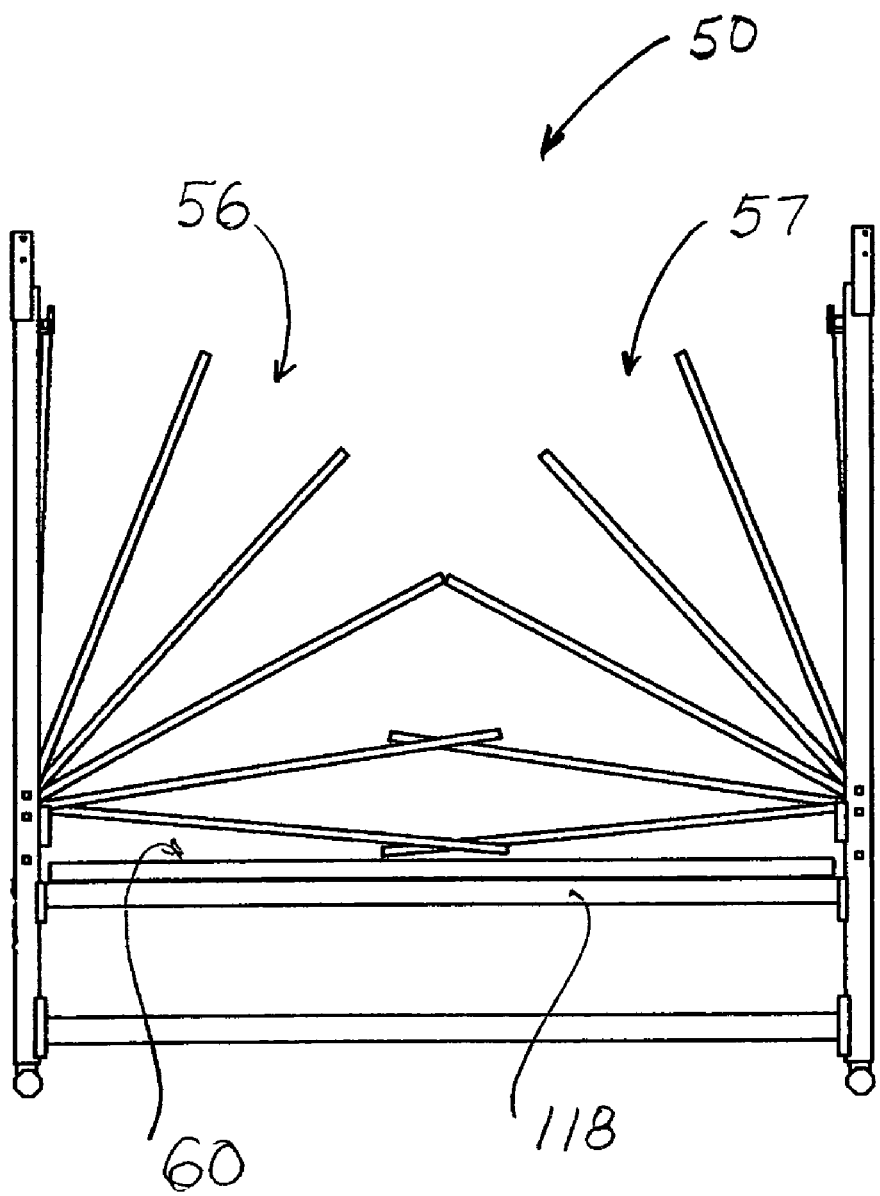
FIG. 9 depicts an end view and the operation of the livestock feeder of FIG. 1 with the end gate removed.
Figure 10:
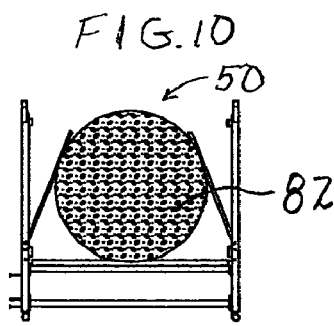
FIGS. 10-15 depict the same operation of the livestock feeder of FIG. 9 with progressive consumption of a hay bale.
Figure 11:
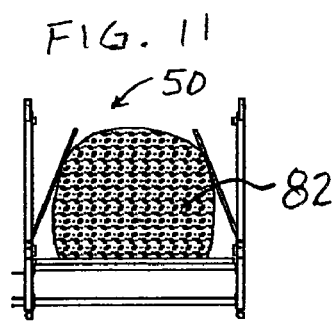
Figure 12:
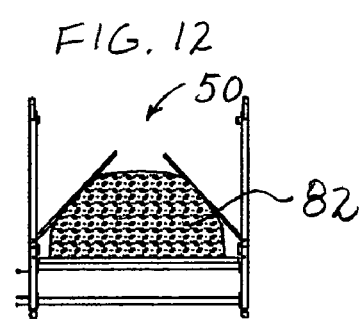
Figure 13:
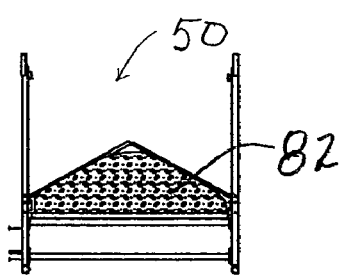
Figure 14:
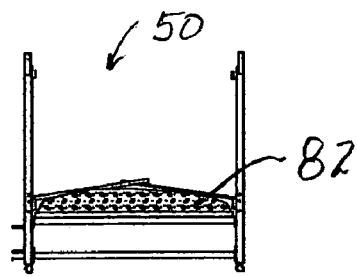
Figure 15:
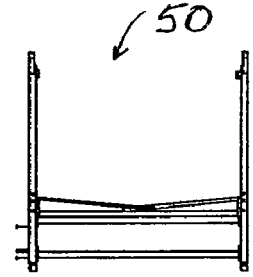

FIG. 9 depicts and end view and the operation of the livestock feeder of FIG. 1 with the end gate and the retention board removed. As depicted, each of fold-down and opposing side grills 56 and 57 starts in the fixed, upright or locked position and then folds down toward floor 60 or floor support 118 as the hay bale (not shown) is consumed.

FIGS. 10-15 depict the same operation of the livestock feeder of FIG. 9 with progressive consumption of hay bale 82. Note as the hay bale is consumed, the opposing fold-down side grills compress the hay will still allowing the animal to reach the feed supply through the grill spacer bars. The hay is kept off the ground to prevent spoilage by the consuming animal, and waste is kept to an absolute minimum. Ranchers feeding quality hay report hay savings of 75 percent. The fold-down grills also prevent livestock such as horses from burying their face in the hay and causing them to breath hay dust which can cause asthma like symptoms. This burying action also allows livestock to pull large junks of feed that can fall on the ground and be wasted. This is eliminated with the grill spacer bars preventing this burying action.

A list of elements is provided merely for the convenience of the reader. It is to be understood that this list of elements does not in any way limit the scope of the present invention. This portable livestock feeder and the kit of parts therefor is limited only by the scope of the attached claims, and it is to be understood that various different parts and combinations of parts is contemplated by this invention as can be readily understood by one ordinarily skilled in the art.

LIST OF ELEMENTS

50 Livestock feeder
51 Main frame
52 First side section
53 Second side section
54 First end section
55 Second end section
56 First fold-down side grill
57 Second fold-down side grill
58 First fold-out end gate
59 Second fold-out end gate
60 Floor
61 First corner member or post
62 Second corner member or post
63 Third corner member or post
64 Fourth corner member or post
65 Grill spacer bars
66 Grill bar space
67 First or lower grill base member
68 Second or upper grill base member
69 First rotatory member
70 Second rotatory member
71 Third rotatory member
72 Fourth rotatory member
73 Pivot or fold-down position
74 Fixed, locked, upright or vertical position
75 First grill latch
76 Second grill latch
77 Third grill latch
78 Fourth grill latch
79 Upper gate hinge
80 Lower gate hinge
81 Gate latch
82 Supply of feed (bale of hay)
83 First runner
84 Second runner
85 First side support (beam or pipe)
86 Second side support
87 First side brace
88 Second side brace
89 First end floor support
90 First end lower support
91 First end floor retention angle
92 Mid-floor support
93 Retainer board
94 Retainer channel 95 Roof strap
96 First pivot arm
97 Second pivot arm
98 Third pivot arm
99 Fourth pivot arm
100 Kit of parts for livestock feeder
101 Other grill spacer bars
102 Other grill bar space
103 Other first or lower base member
104 Other second or upper base member
105 Gate spacer bar
106 Gate bar space
107 First or lower base member
108 Second or upper base member
109 Other gate spacer bar
110 Other gate bar space
111 Other first or lower base member
112 Other second or upper base member
113 Roof
114 Upright position
115 Flat plate
116 Flat plate aperture
117 3 inch threaded bolt
118 Second end floor support
119 Second end lower support
120 Second end retention angle
121 Floor plank retention strip

What is claimed is:

1. A kit of parts for a livestock feeder comprising:
a plurality of corner members;
a plurality of floor supports that when assembled with and connected to said corner members, can support a supply of livestock feed;
at least one grill comprising a plurality of grill spacer bars and at least one base member that when assembled with and connected to said grill spacer bars, maintains a grill bar space between said grill spacer bars, said grill bar space being dependent on what kind of livestock can reach a supply of livestock feed through said grill spacer bars; and
at least one pivot arm that when assembled with and pivotally connected to said at least one grill above said floor supports and at least one of said corner members, can pivot said at least one grill toward said floor supports.

2. The kit of parts of claim 1 further comprising at least one rotatory member including said at least one pivot arm and that when assembled with and connected to said at least one grill and said at least one of said corner members, can rotate to position said at least one grill into a fixed position with respect to said floor supports.

3. The kit of parts of claim 1 further comprising an other grill comprising a plurality of other grill spacer bars and at least one other base member that when assembled with and connected to said other grill spacer bars, maintains an other grill bar space between said other grill spacer bars, said other grill bar space being dependent on what kind of livestock can reach a supply of livestock feed through said other grill spacer bars, and the kit of parts also comprising at least one other pivot arm that when assembled with and pivotally connected to said other grill above said floor supports and at least one other of said corner members, can pivot said other grill toward said floor supports and said at least one grill.

4. The kit of parts of claim 1 further comprising at least one end gate that when assembled with and connected to at least one of said corner members and said floor supports, can open to position a supply of livestock feed on said floor supports.

5. The kit of parts of claim 4 wherein said at least one end gate includes a plurality of gate spacer bars and at least one gate base member that when assembled with and connected to said gate spacer bars, maintains a gate bar space between said gate spacer bars, said gate bar space being dependent on what kind of livestock can reach a supply of livestock feed through said gate spacer bars.

6. The kit of parts of claim 5 further comprising a gate latch that when assembled with and attached to at least one of said end gate and at least one of said corner members, can latch said end gate.

7. The kit of parts of claim 1 further comprising at least a first and a second runner that when assembled with said corner members is connected to selected ones of said corner members.

8. The kit of parts of claim 1 further comprising at least one grill latch that when assembled with and attached to at least one of said at least one grill and at least one of said corner members, can latch said at least one grill in a fixed position.

9. The kit of parts of claim 1 further comprising a plurality of roof parts that when assembled with and connected to said corner members, can attach a roof thereto.

10. The kit of parts of claim 1 further comprising at least one floor member that when assembled with and connected to said floor supports, can hold a supply of livestock feed.

11. The kit of parts of claim 1 wherein said grill bar space ranges from 2 inches to 8 inches dependent on the kind of livestock that is intended to reach a supply of livestock feed through said grill spacer bars.

12. The kit of parts of claim 1 further comprising at least one rotatory member including said at least one pivot arm and that when assembled with and connected to said at least one grill and said at least one of said corner members, can rotate to position said at least one grill into a fixed position with respect to said floor supports; an other grill comprising a plurality of other grill spacer bars and at least one other base member that when assembled with and connected to said other grill spacer bars, maintains an other grill bar space between said other grill spacer bars, said other grill bar space being dependent on what kind of livestock can reach a supply of livestock feed through said other grill spacer bars; at least one other pivot arm that when assembled with and pivotally connected to said other grill above said floor supports and at least one other of said corner members, can pivot said other grill toward said floor supports and said at least one grill; at least one end gate that when assembled with and connected to at least one of said corner members and said floor supports, can open to position a supply of livestock feed on said floor supports, wherein said at least one end gate includes a plurality of gate spacer bars and at least one gate base member that when assembled with and connected to said gate spacer bars, maintains a gate bar space between said gate spacer bars, said gate bar space being dependent on what kind of livestock can reach a supply of livestock feed through said gate spacer bars; at least one gate latch that when assembled with and attached to at least one of said at least one end gate and said corner members, can latch said at least one end gate; at least a first and a second runner that when assembled with said corner members is connected to selected ones of said corner members; a first and a second grill latch that when assembled with and attached to at least one of said corner members and said at least one grill and said other grill, respectively, can latch said at least one grill and said other grill in the fixed position; a plurality of roof parts that when assembled with and connected to said corner members, can attach a roof thereto; and at least one floor member that when assembled with and connected to said floor supports, can hold a supply of livestock feed, the bar spaces ranging from 2 inches to 8 inches.

13. A kit of parts for a livestock feeder comprising:
   a plurality of corner members;
   a plurality of floor supports that when assembled with and connected to said corner members, can support a supply of livestock feed;
   a first and a second grill each comprising a plurality of grill spacer bars and at least one grill base member that when assembled with and connected to the grill spacer bars, maintains a grill bar space between the grill spacer bars, said grill bar space being dependent on what kind of livestock can reach a supply of livestock feed through the grill spacer bars; and
   a first and a second pair of pivot arms that when assembled with and pivotally connected to said first and said second grill above said floor supports, respectively, and a first and a second pair of said corner members, respectively, can pivot the respective grill down toward said floor supports and each other.

14. The kit of parts of claim 13 further comprising a first and a second pair of grill latches and a first and a second pair of rotatory members including the first and the second pair of pivot arms, respectively, that when assembled and rotated, can position the respective grill into a fixed position with said floor supports.

15. A livestock feeder comprising:
   a main frame having a plurality of corner members and a plurality of floor supports That can maintain said corner members in an upright position to support a supply of livestock feed;
   at least one grill having a plurality of grill spacer bars having a grill bar space there between, said grill bar space being dependent on what kind of livestock is intended to reach a supply of livestock feed through said grill spacer bars, said at least one grill having at least one grill base member positioned with said grill spacer bars and maintaining said grill bar space between said grill spacer bars; and
   a first and a second pivot arm pivotally connecting a pair of said corner members and said at least one grill above said floor supports, wherein all of said at least one grill can pivot toward said floor supports.

16. The livestock feeder of claim 15 further comprising at least one rotatory member including said at least one pivot arms, wherein said rotatory member also connects said pair of said corner members and said at least one grill above said floor supports and can be rotated to position said at least one grill into a fixed position with respect to said floor supports.

17. The livestock feeder of claim 16 further comprising at least one grill latch to maintain said at Least one grill in the fixed position.

18. The livestock feeder of claim 15 further comprising at least one end gate adjacent said at least one grill and at least one of said corner members, whereby said at least one end gate can be opened to insert a supply of livestock feed on said floor supports.

19. The livestock feeder of claim 15 wherein said grill bar space ranges from 2 inches to 8 inches dependent on what kind of livestock is intended to reach a supply of livestock feed through said grill spacer bars.

20. The livestock feeder of claim 15 further comprising at least one rotatory member including said at least one pivot arm wherein said rotatory member can upwardly position said pivot arm and said at least one grill into a fixed position with respect to said floor supports; at least one grill latch to maintain said at least one grill in the fixed position; at least one end gate adjacent said at least one grill and at least one of said corner members, wherein said at least one end gate includes a plurality of gate spacer bars having a gate bar space dependent on what kind of livestock can reach a supply of livestock feed through said at least one gate spacer bars; wherein the bar spaces each range from 2 inches to 8 inches dependent on what kind of livestock is intended to reach a supply of livestock feed through the spacer bars; a first runner attached to a first pair of said corner members and a second runner attached to a second pair of said corner members; a floor positioned on said floor supports and positioned a predetermined distance above said runners dependent on what kind of livestock is intended to be fed from said feeder.

* * * * *